United States Patent [19]
Glazier

[11] Patent Number: 6,092,646
[45] Date of Patent: Jul. 25, 2000

[54] MAGNIFYING CONTACT LENS STORAGE UNIT

[76] Inventor: Alan N. Glazier, 11409 Commonwealth Dr., #302, Rockville, Md. 20852

[21] Appl. No.: 09/333,259

[22] Filed: Jun. 15, 1999

[51] Int. Cl.$^7$ .................................................. A45C 11/04
[52] U.S. Cl. ............................................ 206/5.1; 220/663
[58] Field of Search ........................... 206/5.1, 769, 776, 206/777, 781, 782; 220/662, 663

[56] References Cited

U.S. PATENT DOCUMENTS

| | | |
|---|---|---|
| 4,545,479 | 10/1985 | Figari . |
| 4,623,249 | 11/1986 | Grant . |
| 4,784,258 | 11/1988 | Figari . |
| 5,099,987 | 3/1992 | Bieri . |
| 5,246,259 | 9/1993 | Hellenkamp et al. . |
| 5,337,888 | 8/1994 | Morrison . |
| 5,515,964 | 5/1996 | Bauman . |

FOREIGN PATENT DOCUMENTS

| | | |
|---|---|---|
| 2093605 | 9/1982 | United Kingdom . |
| WO 90/02496 | 3/1990 | WIPO . |

*Primary Examiner*—Jacob K. Ackun
*Attorney, Agent, or Firm*—Pillsbury Madison & Sutro Intellectual Property Group

[57] ABSTRACT

A magnifying contact lens storage unit that comprises a body having at least one cavity with a top opening, at least one magnifying lens, and a fluid-tight closure lid fixedly attached to the top opening. The body may further have a planar flange, and the magnifying lens may be within the flange, the cavity, the closure lid, or within any combination of those structures. The magnifying lens has a predetermined magnification power for permitting viewing and inspection of the contact lens after removal of the contact lens from the storage unit. The body, flange, and/or closure lid may be optically transparent, and may fit exteriorly within an orbital aperture of a contact lens wearer's face.

25 Claims, 4 Drawing Sheets

MAGNIFYING CONTACT LENS STORAGE UNIT

BACKGROUND OF THE INVENTION

1. Field of the Invention

The present invention relates generally to a contact lens storage unit. More specifically, the invention is a storage unit for contact lenses wherein the storage unit has a magnifier.

2. Description of the Related Art

A number of devices and practices have been devised for viewing and inspecting contact lenses which are immersed in an aqueous solution within a contact lens storage unit, or which have been removed from the storage unit.

For example, U.S. Pat. No. 4,545,479 issued on Oct. 8, 1985 and U.S. Pat. No. 4,784,258 issued on Nov. 15, 1988 to Figari disclose generally a contact lens carrying case which employs a cylindrical right and left housing sections. Each housing section has an open top and a closed bottom, which has a magnifying lens assembly. The open top is covered by a cover member, which also contains a magnifying lens assembly. Thus, a contact lens which is emplaced within the hollow of the housing can be viewed in a magnified manner from either the top or bottom due to the magnifying lens assembly.

U.S. Pat. No. 4,623,249 issued on Nov. 18, 1986 to Grant discloses a device for storing an optical element including two sets of optical surfaces for allowing examination of an optical element in two directions. To ensure that the chamber containing the lens is filled with fluid, an opening is displaced horizontally and vertically from the chamber to remain out of the optical viewing path and to be higher than the optical chamber to prevent formation of bubbles in the chamber.

U.S. Pat. No. 5,099,987 issued on Mar. 31, 1992 and WIPO Patent No. WO 90/02496, published Mar. 22, 1990, to Bieri disclose a device for storing and examining contact lenses that comprises a body with at least two cavities for storing contact lenses. The cavity can be sealed by an air-tight, water-tight lid and has a base specially shaped to allow storage of the contact lenses. A liquid container which communicates with the cavities through two channels is arranged in the body. At least one convex lens which magnifies the image of the contact lens can be mounted on the lower surface.

U.S. Pat. No. 5,246,259 issued on Sep. 21, 1993 to Hellenkamp et al. discloses an applicator assembly comprising a base having a handle portion and a support portion. The assembly includes an applicator movably mounted or connected to the base and selectively positionable between an outwardly extending operative position wherein the lens is transferred to the eyeball, and a stored position wherein the contact lens is removably secured to the applicator.

U.S. Pat. No. 5,337,888 issued on Aug. 16, 1994 to Morrison discloses a contact lens case that includes a cup-shaped bottom and a cover sealed thereto, both being transparent and of a rigid material. The package includes means for determining the diameter of the lens therein and since it is transparent, the lens can be visually examined for defects.

U.S. Pat. No. 5,515,964 issued on May 14, 1996 to Baumar discloses a lens storage container that includes an integrally formed receptacle member having a spheroidal well providing a concave recess in which the lens is disposed. In some embodiments, a lip extends about a portion of the periphery of the well to maintain the lens in the well therebelow.

Great Britain Patent No. 2,093,605, published Sep. 2, 1982, discloses a device which facilitates positioning a contact lens on a pedestal.

The prior art fails to teach a device which enables an operator to simply, inexpensively, and effectively inspect and view contact lenses which have been removed from a lens storage container prior to the lenses being applied a contact lens wearer's eyes. None of the above inventions and patents, taken either singularly or in combination, is seen to describe the instant invention as claimed. Thus a magnifying contact lens storage unit solving the aforementioned problems is desired.

SUMMARY OF THE INVENTION

A magnifying contact lens storage unit that comprises a body, a magnifying means, and a fluid-tight closure means. The body has a portion at least one cavity formed therein, wherein the cavity is further defined by a top opening adapted for attaching to the closure means. The body may further have a planar flange. The cavity has a bottom, and receives at least one contact lens and a sufficient volume of contact lens storage media to completely submerge the contact lens.

The magnifying means may be at least one magnifying lens, and may be within or attached to the flange, the cavity, the closure means, or within any combination of those structures. The magnifying means has a predetermined magnification power for permitting viewing and inspection of the contact lens which have been removed from the unit prior to the contact lens being applied to a contact lens wearer's eyes. The fluid-tight closure means may be a lid or cover selected from the group consisting of a foil sheet, a plastic sheet, and a reusable plastic cap. The closure means is dimensioned and configured to cover the top opening and is fixedly attached to the top opening.

The body, flange, and/or closure means may be optically transparent, and may be dimensioned and configured to fit exteriorly within an orbital aperture of a contact lens wearer.

Accordingly, it is a principal object of the invention to provide a storage unit for at least one contact lens wherein the storage unit is used for viewing and inspecting the contact lens which have been removed from the unit.

It is another object of the invention to provide a storage unit for at least one contact lens wherein the storage unit is used for viewing and inspecting the contact lens which have been removed from the unit, as well as for viewing and inspecting at least one contact lens which are within the unit.

It is a further object of the invention to provide a storage unit for at least one contact lens wherein the storage unit is used for viewing and inspecting, without involving either of a contact lens wearer's hands, the contact lens which have been removed from the unit.

Still another object of the invention is to provide a storage unit for at least one contact lens wherein the storage unit is used for viewing and inspecting, with increased speed and efficiency, the contact lens which have been removed from the unit.

It is an object of the invention to provide improved elements and arrangements thereof for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
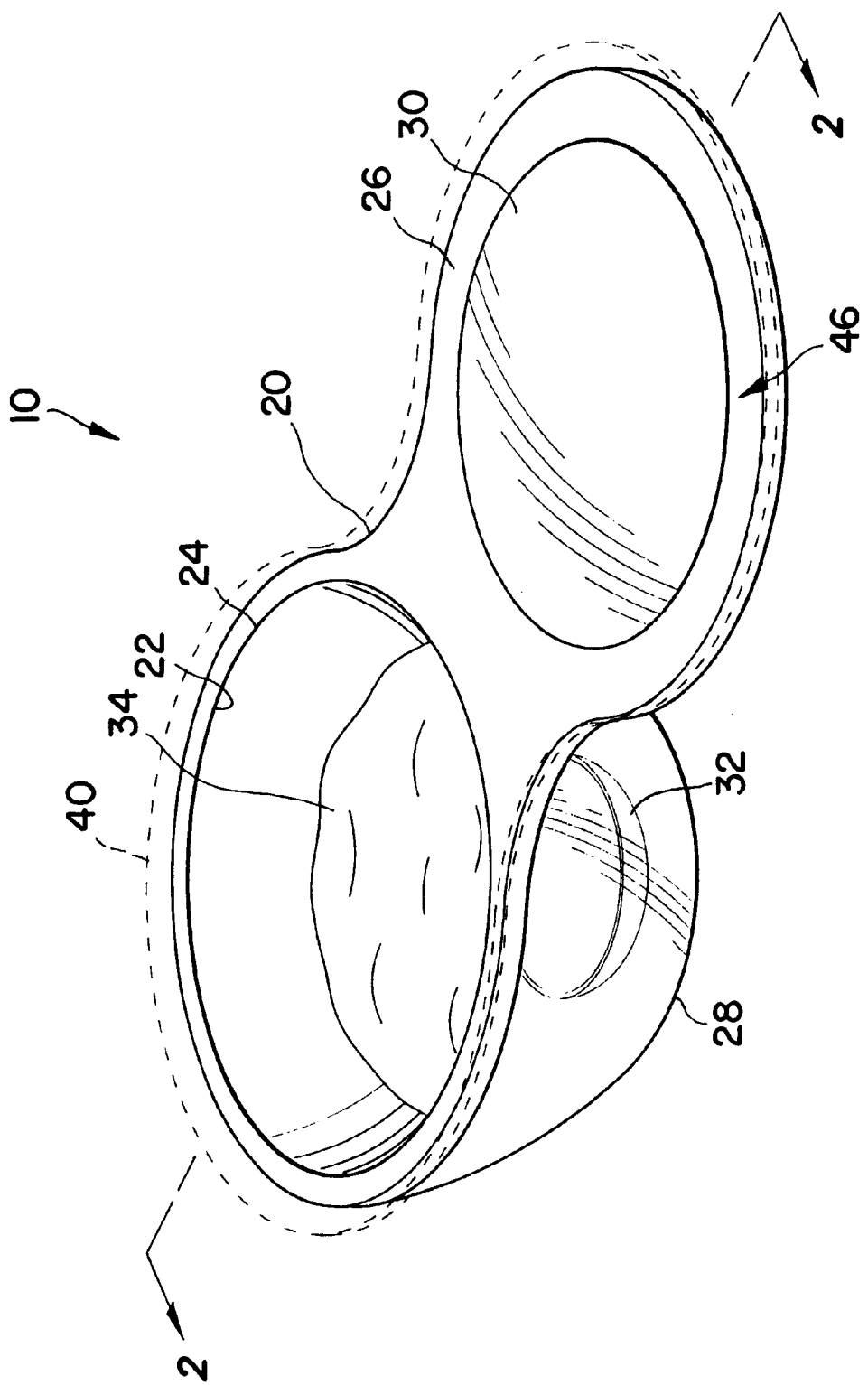
FIG. 1 is environmental, perspective view of a first embodiment magnifying contact lens storage unit according to the present invention, with a fluid-tight closure means in dashed lines.

Referring to FIGS. 1–4, the present invention is directed to a magnifying contact lens storage unit 10 that comprises a body 20 having a cavity-defining portion with and or associated at least one cavity 22 top opening 24, a magnifying means 30, and a fluid-tight closure means 40.

Figure 2:
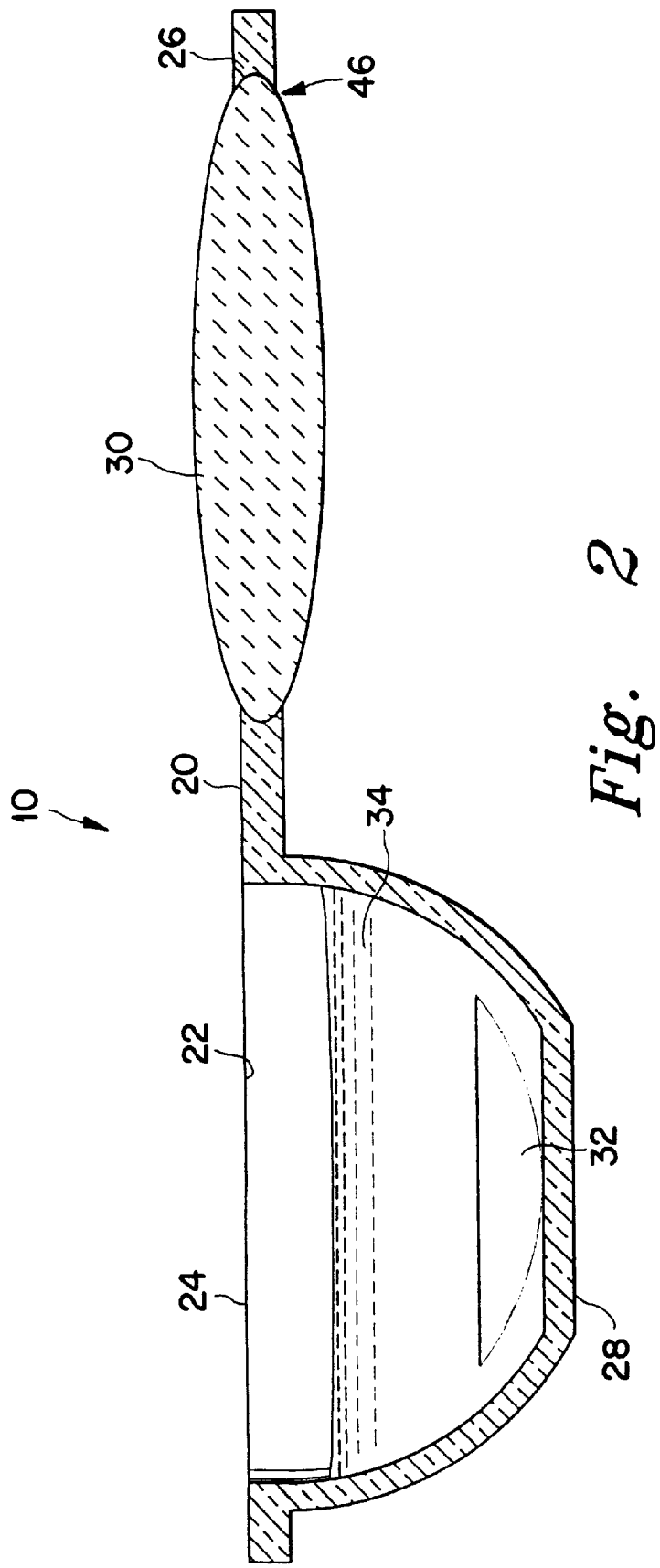
FIG. 2 is a cross-sectional view of the magnifying contact lens storage unit, without the closure means, along line 2—2 of FIG. 1.
Figure 3:
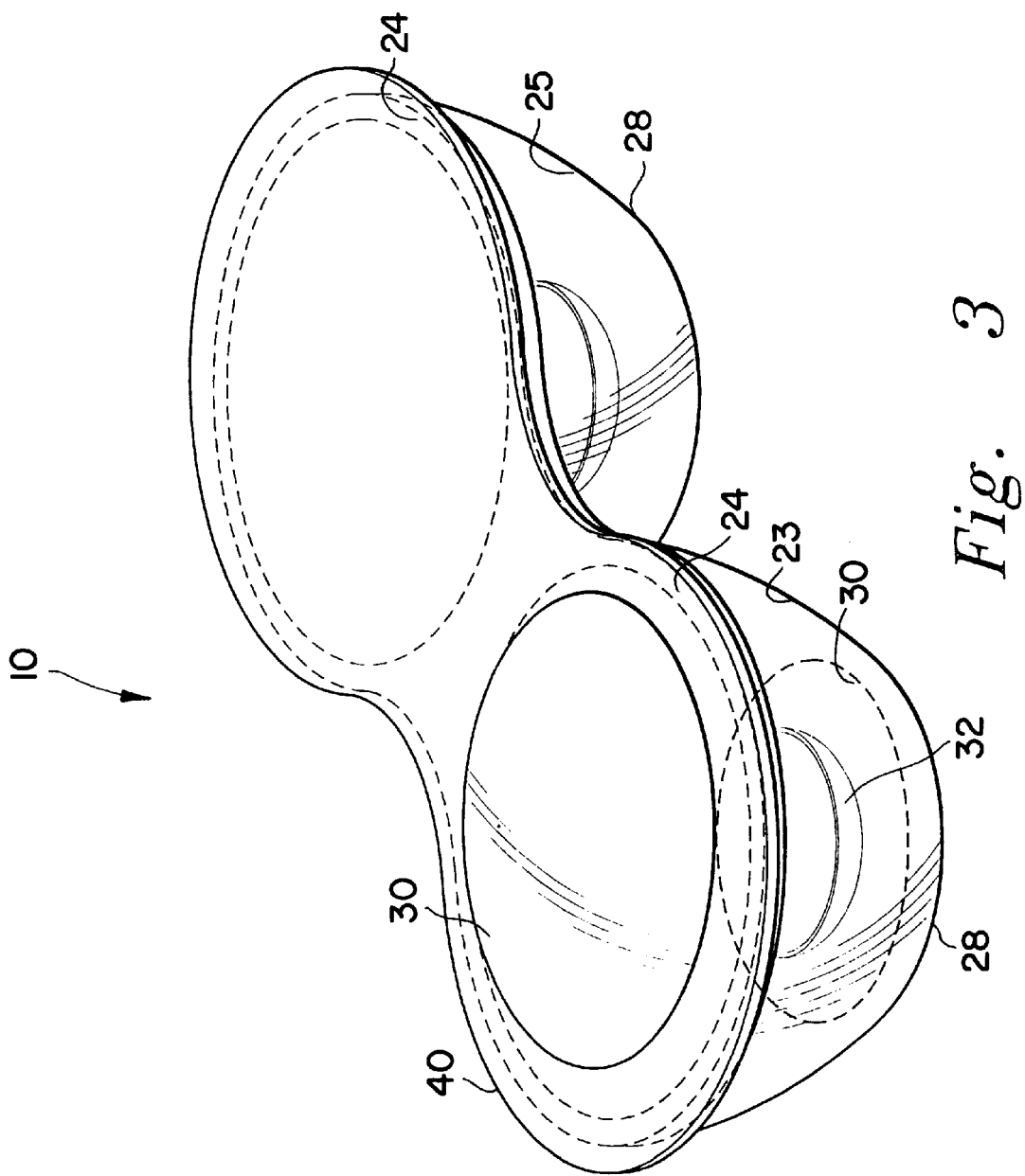
FIG. 3 is an environmental, perspective view of additional embodiments of a magnifying contact lens storage unit according to the present invention, wherein the surface of the top openings of the cavities are in dashed lines and the magnifying means in the magnifying cavity are in dashed lines.

In the first embodiment (as shown in FIGS. 1 and 2), the body 20 has a cavity-defining portion with one cavity 22 formed therein, and a planar flange 26. The cavity 22 (as shown in FIGS. 1–3) has a bottom 28, and is dimensioned and configured to receive one contact lens 32 and a sufficient volume of an aqueous fluid 34 to completely submerge the contact lens 32. Such fluid 34 is known as storage media for contact lenses 32. The cavity 22 further defines the top opening 24 (as shown in FIGS. 1–3) that is adapted for attachment to the closure means 40. As shown in FIGS. 1 and 2, in the first embodiment the cavity-defining portion of the body 20 and the flange 26. have respective upper surfaces that are coplanar and continuous with each other. However, the cavity-defining portion of the body 20 has a first thickness, measured from the top opening 24 of the cavity-defining portion to the lower surface of bottom 28 of the cavity-defining portion, that is less than the flange 26 thickness (also referred to herein as the second thickness).

Figure 4:
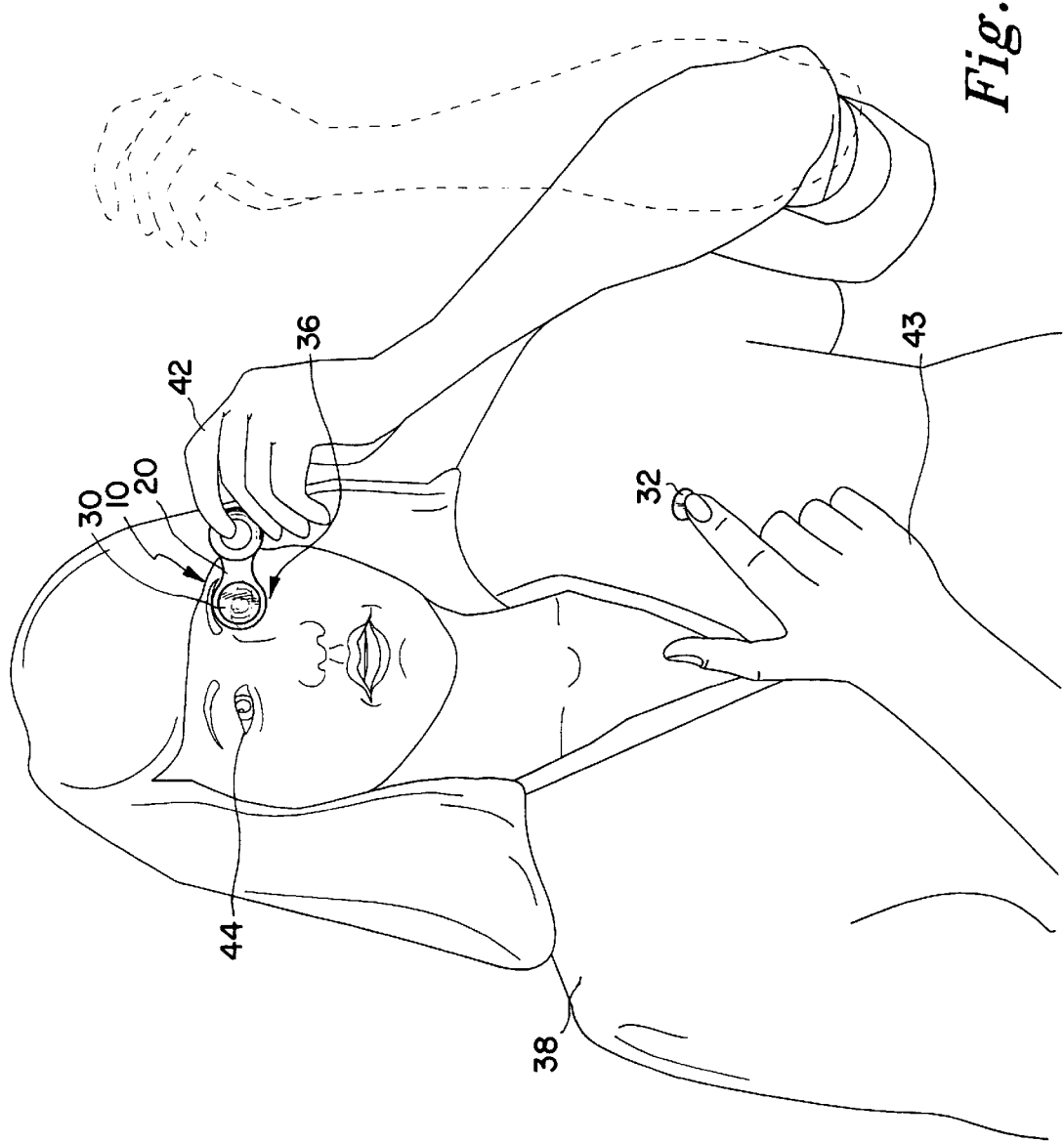
FIG. 4 an environmental, perspective view of a contact lens wearer using the magnifying contact lens storage unit, with the wearer's arm in another position in dashed line.

It is preferred that the flange 26 is optically transparent, and is dimensioned and configured to fit exteriorly within an orbital aperture 36 (as shown in FIG. 4) of a contact lens wearer's 38 face, so that the wearer 38 may use the flange 26 in a manner similar to how a monocle is worn. This allows the wearer 38 to easily view and inspect the contact lens 32 while manipulating or adjusting the contact lens 32 with both hands (42, 43) prior to applying the contact lens 32 to the eye 44 of the wearer 38.

Preferably, the magnifying means 30 (as shown in FIGS. 1–4) is one magnifying lens. The magnifying lens 30 is preferably located within the flange 26, and has a predetermined magnification power for permitting viewing and inspection of the contact lens 32 that have been removed from the unit 10, as well as contact lenses 32 that are within the unit 10. For this invention to be applicable and useful to as many contact lens wearers 38 as possible, it is preferred that the magnification power of the magnifying lens 30 corresponds to the contact lens prescription of the wearer 38. For example, if the contact lens prescription is above −9.00, the magnification power may be −7.00 so as to give the wearer 38 are effective magnification of about +2.00.

The fluid-tight closure means 40 (as shown in FIGS. 1 and 3) is preferably a removable lid or cover selected from the group consisting of a foil sheet, a plastic sheet, and a reusable plastic cap. For embodiments pertaining to disposable storage units 10 storing contact lenses 32, it is preferred that the closure means 40 is a removable foil or plastic sheet. On the other hand, for embodiments pertaining to reusable or permanent storage units 10 storing contact lenses 32, it is preferred that the closure means 40 is a removable reusable plastic cap. Examples of such plastic caps are a cap having threads (not shown), a snap-on cap (not shown), etc. The closure means 40 is dimensioned and configured to sealingly cover the top opening 24, and is fixedly attached to the top opening 24 by any well known process in the art, such as adhesively bonding (gluing) heat sealing, etc. For closure means 40 to be applicable to a reusable or permanent storage unit 10 storing contact lense 32, it is preferred that the closure means 40 is a reusable plastic cap 32 which is fixedly attached to the top opening 24 being adapted for attaching with the cap 40.

For manufacturing and cosmetic purposes, it is preferred that the flange 26 and the magnifying lens 30 are of one piece construction. However, in embodiments where the flange 26 defines an opening 46 (as shown in FIGS. 1 and 2), it is preferred that the magnifying lens 30 and the flange 26 are separate parts and that the magnifying lens 30 is secured within the opening 46 of the flange 26.

If the flange 26 is not dimensioned and configured to fit exteriorly within the orbital aperture 36 of the contact lens wearer's 38 face, the wearer 38 may use the unit 10 by holding the unit 10 in one hand 42 to view, inspect, manipulate, or adjust the contact lens 32 located in the other hand 43 prior to applying the contact lens 32 to the eye 44 of the wearer 38. The wearer 38 may then place the unit 10 down, and use both hands (42, 43) to apply the contact lens 32 to the eye 44.

In a second embodiment (as shown in FIG. 3), the body 20 of the storage unit 10 has two cavities (23, 25) and does not have the planar flange 26. Also, the magnifying means 30 is located within a magnifying cavity 23 (as shown in FIG. 3) of the body 20 to define part of the bottom 28 of the magnifying cavity 23. It is preferred that the magnifying means 30 is a magnifying lens 30, that the magnifying cavity 23 is optically transparent, and that the body 20 is dimensioned and configured to fit exteriorly within an orbital aperture 36 of the wearer's 38 face. For manufacturing and cosmetic purposes, it is preferred that the cavities (23, 25) and the magnifying lens 30 are of one piece construction. However, in alternative embodiments wherein the cavities (23, 25) and the magnifying lens 30 are separate parts, it is preferred that the magnifying lens 30 is secured to the bottom 28 of the magnifying cavity 23 by any well known process in the art, such as gluing etc.

If the body 20 is not dimensioned and configured to fit exteriorly within the orbital aperture 36 of the contact lens wearer's 38 face, the wearer 38 may use the unit 10 held in one hand 42 to view, inspect, manipulate, or adjust the contact lens 3, held in the other hand 43 prior to applying the contact lens 32 to the eye 44. The wearer 38 may then place the unit 10 down and use both hands (42, 43) to apply the contact lens 32 to the eye 44 of the wearer 38.

In a third embodiment (as shown in FIG. 3), the body 20 of the storage unit 10 does not have the planar flange 26 and the magnifying means 30 is within the closure means 40. It is preferred that the magnifying means 30 is a magnifying lens 30, that the closure means 40 is optically transparent, and that the closure means 40 is selected from the group consisting of a plastic sheet and a reusable plastic cap. When the storage unit 10 storing contact lenses 32 is disposable, it is preferred that the closure means 40 is a plastic sheet. On the other hand, the storage units 10 storing contact lenses 32 is reusable or permanent, it is preferred that the closure means 40 is a reusable plastic cap. For manufacturing and cosmetic purposes, it is preferred that the closure means 40 and the magnifying lens 30 are of one piece construction. It is also preferred that the closure means 40 is dimensioned and configured to fit exteriorly within the orbital aperture 36 of the contact lens wearer's 38 face, and has sufficient strength and rigidity to be held exteriorly in the orbital aperture 36.

If the closure means 40 is not dimensioned and configured to fit exteriorly within the orbital aperture 36 of the contact lens wearer's face 38, the wearer 38 may use the closure means 40 held in one hand 42 to view, inspect, manipulate, or adjust the contact lens 32 held in the other hand 43 prior to applying the contact lens 32 to the eye 44. The wearer 38 may then place the closure means 40 down and use both hands (42, 43) to apply the contact lens 32 to the eye 44 of the wearer 38. In FIG. 3, the closure means 40 attaches to the body 20 to simultaneously extend over and seat both of the cavities at the top openings.

It is to be understood that the present invention is no limited to the embodiments described above, but encompasses any and all embodiments within the scope of the following claims.

I claim:

1. A magnifying contact lens storage unit comprising:
   a body having at least one cavity-containing portion with a first thickness and a flange with a second thickness less than said first thickness, said cavity-containing body portion having at least one top opening and an associated cavity with a bottom, said cavity being dimensioned and configured to receive at least one contact lens and a sufficient volume of an aqueous fluid to completely submerge the contact lens, said flange including magnifying means;
   said magnifying means having a predetermined magnification power for permitting viewing and inspection of the contact lens after the contact lens has been removed from said unit; and
   a fluid-tight closure attached to said body to seal said cavity at said top opening.

2. The storage unit of claim 1, wherein said flange is optically transparent.

3. The storage unit of claim 1, wherein said flange and said magnifying means are of one piece construction.

4. The storage unit of claim 1, wherein said flange defines an opening, and said magnifying means is secured within said opening of said flange.

5. The storage unit of claim 1, wherein said flange is dimensioned and configured to fit exteriorly within an orbital of a contact lens wearer.

6. The storage unit of claim 1, wherein said magnifying means comprises at least one magnifying lens.

7. The storage unit of claim 1, wherein said fluid-tight closure is selected from the group consisting of a foil sheet, a plastic sheet, and a reusable plastic cap.

8. A magnifying contact lens storage unit comprising:
   a body having at least one cavity-containing portion and a flange, said cavity-containing body portion and said flange having respective upper surfaces that are coplanar and contiguous with one another, said cavity-containing body portion having at least one top opening and an associated cavity with a bottom, said cavity being dimensioned and configured to receive at least one contact lens and a sufficient volume of an aqueous fluid to completely submerge the contact lens, said flange including a magnifying means;
   said magnifying means having a predetermined magnification power for permitting viewing and inspection of the contact lens after the contact lens has been removed from said unit; and
   a fluid-tight closure attached to said body to seal said cavity at said top opening.

9. The storage unit of claim 8, wherein said flange is optically transparent.

10. The storage unit of claim 8, wherein said flange and said magnifying means are of one piece construction.

11. The storage unit of claim 8, wherein said flange defines an opening, and said magnifying means is secured within said opening of said flange.

12. The storage unit of claim 8, wherein said flange is dimensioned and configured to fit exteriorly within an orbital of a contact lens wearer.

13. The storage unit of claim 8, wherein said magnifying means comprises at least one magnifying lens.

14. The storage unit of claim 8, wherein said fluid-tight closure is selected from the group consisting of a foil sheet, a plastic sheet, and a reusable plastic cap.

15. A magnifying contact lens storage unit comprising:
   a body having at least one top opening and an associated cavity with a bottom surface defining part of said cavity, said cavity being dimensioned and configured to receive at least one contact lens and a sufficient volume of an aqueous fluid to completely submerge the contact lens;
   magnifying means forming part of said bottom surface of said cavity so that said magnifying means defines part of said cavity, said magnifying means having a predetermined magnification power for permitting viewing and inspection of the contact lens after the contact lens has been removed from said unit; and
   a fluid-tight closure "adhesively bonded or heat sealed" said body to seal said cavity at said top opening.

16. The storage unit of claim 15, wherein said body is optically transparent.

17. The storage unit of claim 15, wherein said body and said magnifying means are of one piece construction.

18. The storage unit of claim 15, wherein said body is dimensioned and configured to fit exteriorly within an orbital aperture of a contact lens wearer.

19. The storage unit of claim 15, wherein said magnifying means comprises at least one magnifying lens.

20. The storage unit of claim 15, wherein said closure is selected from the group consisting of foil sheet, a plastic sheet, and a reusable plastic cap.

21. A magnifying contact lens storage unit comprising:
   a body having a pair of top openings and associated cavities, said cavities each being dimensioned and configured to receive at least one contact lens and a sufficient volume of an aqueous fluid to completely submerge the contact lens;
   magnifying means having a predetermined magnification power for permitting viewing and inspection of the contact lens after the contact lens has been removed from said unit; and
   a fluid-tight closure attached to said body to simultaneously extend over and seal both of said cavities at said top openings, said closure including said magnifying means.

22. The storage unit of claim 21, wherein said closure is optically transparent.

23. The storage unit of claim 21, wherein said closure and said magnifying means are of one piece construction.

24. The storage unit of claim 21, wherein said magnifying means comprises at least one magnifying lens.

25. The storage unit of claim 21, wherein said closure comprises plastic.

* * * * *

UNITED STATES PATENT AND TRADEMARK OFFICE
CERTIFICATE OF CORRECTION

PATENT NO.    : 6,092,646
DATED         : July 25, 2000
INVENTOR(S)   : Alan N. Glazier It is certified that error appears in the above-identified patent and that said Letters Patent is hereby corrected as shown below:

Column 3,
Lines 40-41, change ", that is less than the flange 26 thickness (also referred to herein as the second thickness)." to -- . The flange 26 has a thickness (also referred to herein as the second thickness) that is less than the first thickness. --

Signed and Sealed this

Sixteenth Day of April, 2002

Attest:

JAMES E. ROGAN
*Attesting Officer*    *Director of the United States Patent and Trademark Office*